US012614131B2

(12) United States Patent
    Hu et al.

(10) Patent No.: US 12,614,131 B2
(45) Date of Patent: Apr. 28, 2026

(54) ROUTING OPTIMIZATION METHOD FOR TRUCK-DRONE INTEGRATED RESCUE VEHICLES IN FOREST FIREFIGHTING

(71) Applicants: Beijing Everyone Safe Technology Co., Ltd., Beijing (CN); Beijing University of Chemical Technology, Beijing (CN)

(72) Inventors: Songtao Hu, Beijing (CN); Xiang Li, Beijing (CN); Bowen Zhang, Beijing (CN); Nan Chen, Beijing (CN); Xueyou Feng, Beijing (CN)

( * ) Notice: Subject to any disclaimer, the term of this patent is extended or adjusted under 35 U.S.C. 154(b) by 209 days.

(21) Appl. No.: 18/209,608

(22) Filed: Jun. 14, 2023

(65) Prior Publication Data

US 2024/0320572 A1     Sep. 26, 2024

(51) Int. Cl.
    *G06Q 10/047* (2023.01)
    *G01C 21/34* (2006.01)

(52) U.S. Cl.
    CPC ....... *G06Q 10/047* (2013.01); *G01C 21/3446* (2013.01)

(58) Field of Classification Search
    None
    See application file for complete search history.

(56) References Cited

U.S. PATENT DOCUMENTS

| | | | | |
|---|---|---|---|---|
| 9,665,094 | B1 * | 5/2017 | Russell | B64U 10/14 |
| 10,216,181 | B2 * | 2/2019 | Fox | G08B 25/016 |
| 10,988,251 | B2 * | 4/2021 | Georges | B64D 47/02 |
| 11,004,001 | B1 * | 5/2021 | Frank | G06N 5/04 |
| 12,184,803 | B2 * | 12/2024 | Horelik | H04M 3/5133 |
| 2006/0058928 | A1 * | 3/2006 | Beard | G01C 23/005 |
| | | | | 244/175 |
| 2008/0278311 | A1 * | 11/2008 | Grange | G06F 16/29 |
| | | | | 340/539.2 |
| 2017/0088261 | A1 * | 3/2017 | Sequeira | G01S 13/0209 |
| 2017/0092109 | A1 * | 3/2017 | Trundle | G05D 1/104 |
| 2017/0349283 | A1 * | 12/2017 | Paunicka | B64U 70/20 |
| 2018/0251234 | A1 * | 9/2018 | Wang | G05D 1/6542 |
| 2019/0102623 | A1 * | 4/2019 | Flood | G05D 1/0094 |
| 2019/0130770 | A1 * | 5/2019 | Di Benedetto | G08G 5/32 |

(Continued)

*Primary Examiner* — Jonathan M Dager
(74) *Attorney, Agent, or Firm* — Addison D. Ault; IPGentleman Intellectual Property Services, LLC

(57) ABSTRACT

A routing optimization method for truck-drone integrated rescue vehicles in forest firefighting includes the following steps: collecting the data of the disaster sites caused by forest fires, calculating transportation time on road and flight time according to the data of the disaster sites, and getting the transportation time data of post-disaster relief; based on the disaster site data, transportation time data, and an amount of relief supplies that can be allocated to disaster relief sites, constructing a mathematical model of the truck-drone based vehicle routing problem; solving the mathematical model of the truck-drone based vehicle routing problem by the optimization algorithm, and specifying a post-disaster rescue route of the truck-drone integrated rescue vehicle according to the solution results. The model based on the truck-drone based vehicle routing problem method can reduce the impact of sudden natural disasters, and give full play to the advantages of truck-drone integrated rescue vehicles.

5 Claims, 3 Drawing Sheets

Step S1: collecting the data of disaster sites caused by forest fires, calculating transportation time on road and flight time from disaster relief site to disaster sites and the transportation time among different disaster sites according to the data of the disaster sites, and get the transportation time data of post-disaster relief;

Step S2: based on the disaster site data, transportation time data, and an amount of relief supplies that can be allocated to disaster relief sites in step S1, constructing a mathematical model of the truck-drone based vehicle routing problem to minimize the impact of the disaster;

Step S3: solving the mathematical model of the truck-drone based vehicle routing problem in step S2 by an optimization algorithm, and a post-disaster rescue route of the truck-drone integrated rescue vehicle is specified according to the solution results.

(56)          References Cited

U.S. PATENT DOCUMENTS

| 2019/0168869 A1* | 6/2019 | Georges | ................. | B64D 25/20 |
|---|---|---|---|---|
| 2020/0175468 A1* | 6/2020 | Tsuruta | ............. | G06Q 10/0832 |
| 2020/0334470 A1* | 10/2020 | Abeykoon | ............ | G06V 10/96 |
| 2020/0346751 A1* | 11/2020 | Horelik | ................. | B64U 10/13 |
| 2022/0230133 A1* | 7/2022 | Sugie | .................... | G05D 1/021 |
| 2023/0064973 A1* | 3/2023 | Ceballos Melo | ...... | B64U 10/13 |
| 2023/0396319 A1* | 12/2023 | Lambert | ............ | H04B 7/18504 |
| 2024/0337498 A1* | 10/2024 | Sugawara | .......... | G01C 21/3461 |
| 2025/0004477 A1* | 1/2025 | Konishi | ................ | G05D 1/606 |

\* cited by examiner

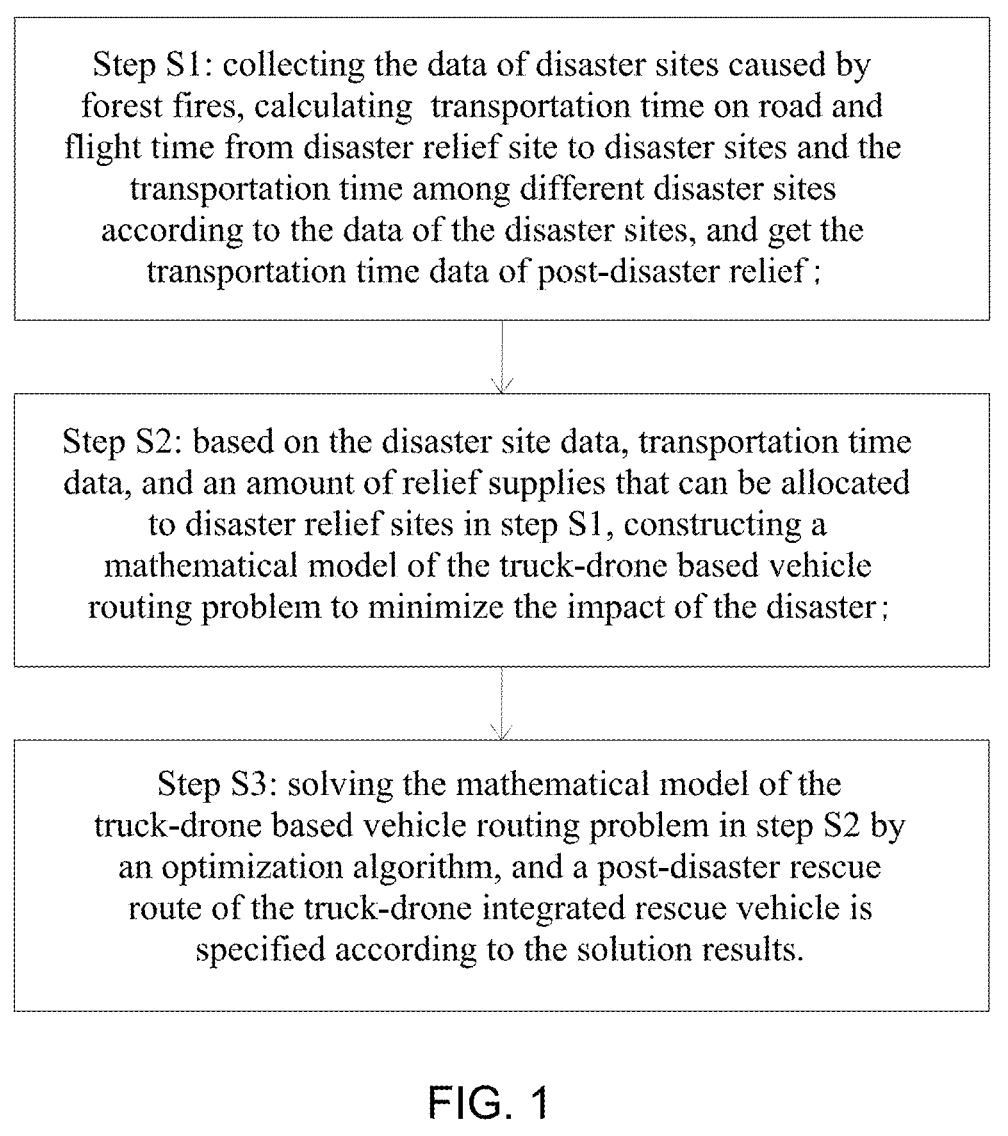

Step S1: collecting the data of disaster sites caused by forest fires, calculating transportation time on road and flight time from disaster relief site to disaster sites and the transportation time among different disaster sites according to the data of the disaster sites, and get the transportation time data of post-disaster relief;

Step S2: based on the disaster site data, transportation time data, and an amount of relief supplies that can be allocated to disaster relief sites in step S1, constructing a mathematical model of the truck-drone based vehicle routing problem to minimize the impact of the disaster;

Step S3: solving the mathematical model of the truck-drone based vehicle routing problem in step S2 by an optimization algorithm, and a post-disaster rescue route of the truck-drone integrated rescue vehicle is specified according to the solution results.

FIG. 1

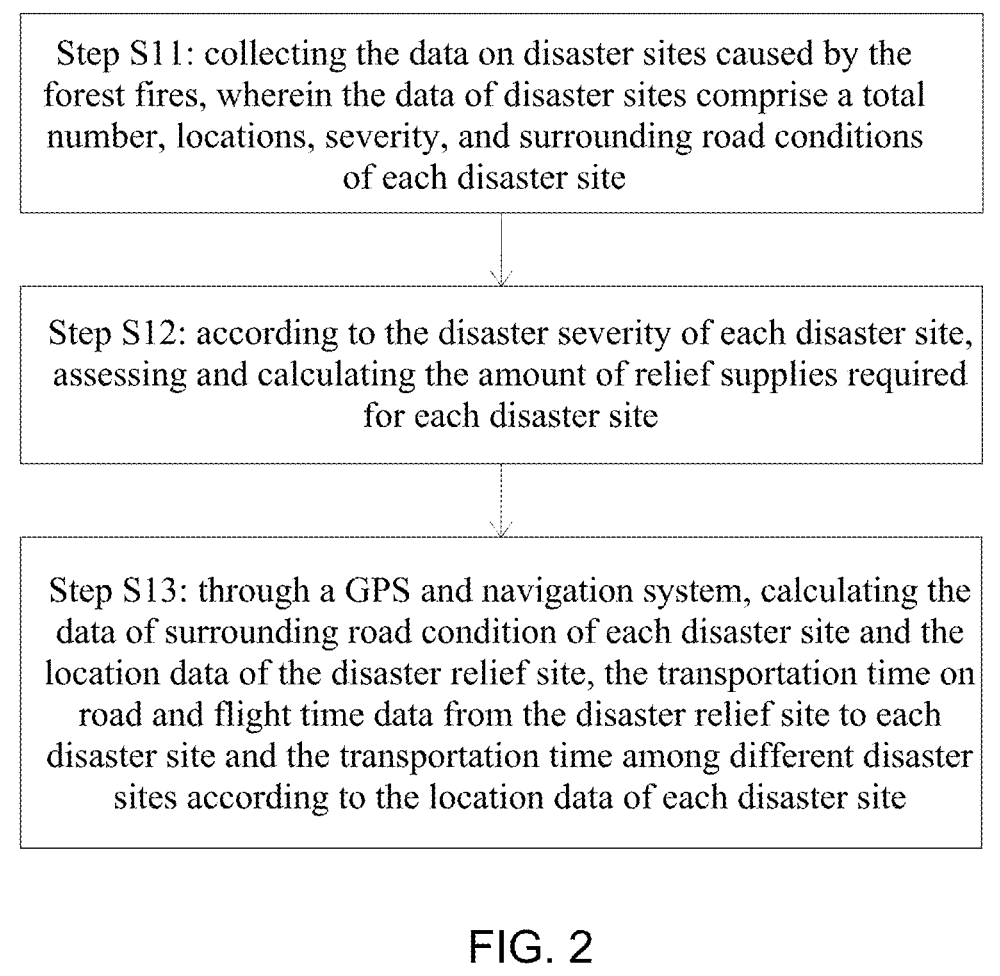

Step S11: collecting the data on disaster sites caused by the forest fires, wherein the data of disaster sites comprise a total number, locations, severity, and surrounding road conditions of each disaster site Step S12: according to the disaster severity of each disaster site, assessing and calculating the amount of relief supplies required for each disaster site Step S13: through a GPS and navigation system, calculating the data of surrounding road condition of each disaster site and the location data of the disaster relief site, the transportation time on road and flight time data from the disaster relief site to each disaster site and the transportation time among different disaster sites according to the location data of each disaster site

FIG. 2

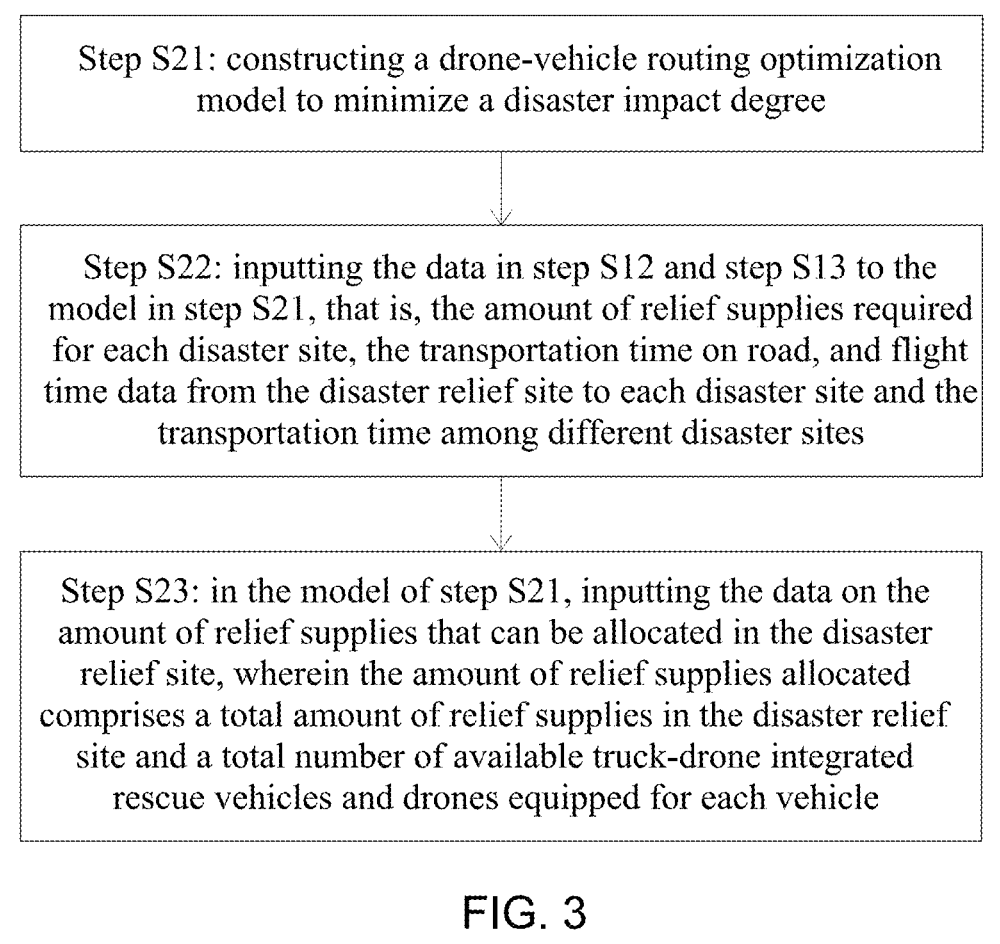

Step S21: constructing a drone-vehicle routing optimization model to minimize a disaster impact degree Step S22: inputting the data in step S12 and step S13 to the model in step S21, that is, the amount of relief supplies required for each disaster site, the transportation time on road, and flight time data from the disaster relief site to each disaster site and the transportation time among different disaster sites Step S23: in the model of step S21, inputting the data on the amount of relief supplies that can be allocated in the disaster relief site, wherein the amount of relief supplies allocated comprises a total amount of relief supplies in the disaster relief site and a total number of available truck-drone integrated rescue vehicles and drones equipped for each vehicle

FIG. 3

ROUTING OPTIMIZATION METHOD FOR TRUCK-DRONE INTEGRATED RESCUE VEHICLES IN FOREST FIREFIGHTING

CROSS REFERENCE TO THE RELATED APPLICATIONS

This application is based upon and claims priority to Chinese Patent Application No. 202310265831.0, filed on Mar. 14, 2023, the entire contents of which are incorporated herein by reference.

TECHNICAL FIELD

The invention relates to the field of traffic operation management technology, in particular to a routing optimization method for truck-drone integrated rescue vehicles in forest firefighting.

BACKGROUND

Forest fire refers to a fire caused by natural or human factors in forest areas, which is a natural disaster with strong suddenness, great destructiveness, and difficulty in handling and rescuing, it has a huge negative impact on the economic development and social stability in China. According to statistics, there are 527 forest fires across the country in the first three quarters of 2021, affecting about 2628 hectares of forest and 15 people dead. It can be seen that the proper handling and rescue of forest fires is an important starting point for ensuring the well-being of people's livelihoods and improving the country's comprehensive management capabilities. It is necessary to continuously optimize the construction of emergency management capability systems and enhance disaster prevention, relief, and mitigation capabilities.

Due to the high uncertainty of the time, place, and degree of damage caused by forest fires, the problem of post-disaster disposal and rescue is very complicated. First of all, forest fires can affect multiple non-adjacent sites at the same time, and rescue vehicles are needed to rescue those sites; secondly, the damage degrees of different disaster sites are quite different, and it is necessary to scientifically allocate limited rescue resources among the disaster sites. Finally, due to the destruction of transport roads around some of the disaster sites, traditional truck-based rescue vehicles cannot reach and function near the disaster sites.

In recent years, drones and related industries have developed rapidly in China, and they already have the technical conditions to equip drones for fire extinguishing operations in traditional ground rescue vehicles. The flexible mobility of drones complements the characteristics of a long transportation distance and the large load capacity of traditional ground rescue vehicles, which is conducive to post-disaster disposal and rescue work under complex road conditions. It is imperative to use the new truck-drone integrated rescue vehicles of 'drone+traditional ground rescue vehicle' to carry out forest fire rescue. However, in the face of complex post-disaster rescue scenarios, how to reasonably and efficiently arrange the rescue work of truck-drone integrated rescue vehicles under limited rescue resources has become the key to enhance the post-disaster rescue capability.

The existing research on the post-disaster disposal and rescue work of truck-drone integrated rescue vehicles is mainly based on the VRPD (Vehicle Routing Problem with Drones), that is, under the constraints of a set of the disaster site and the demand for relief supplies, a mathematical model of drone-vehicle routing optimization with the highest rescue efficiency or the least cost is constructed. Then, some optimization algorithms (such as neighborhood search algorithm, particle swarm optimization algorithm, branch, and bound algorithm) are designed to solve the mathematical model of the above problem, and the optimal solution or satisfactory solution of the post-disaster disposal and rescue route is obtained.

After investigation, although some studies can solve the problem of truck-drone integrated rescue transportation paths under certain assumptions, there are still deficiencies:

(1) It is mechanically believed that drones can only carry out rescues for disaster sites with damaged surrounding road conditions, and does not consider using drones for some disaster sites with a long road transportation distance but a shorter air transportation distance and small demand.

(2) In order to pursue the maximization of rescue efficiency, the possibility of carrying out joint rescue work based on the severity of the disaster is neglected, which leads to a lower rescue priority level for some disaster sites with greater severity far away from the disaster relief sites.

(3) Too much emphasis is placed on using as many rescue forces as possible at the same time, ignoring the possibility of repeated rescue after the truck-drone integrated rescue vehicles return to the relief site to receive supplies.

At present, there is no relevant research that can consider the above three aspects at the same time.

SUMMARY

The purpose of the invention is to solve the above technical problems, and provides a routing optimization method for truck-drone integrated rescue vehicles in forest firefighting.

The technical scheme of the invention is as follows: a routing optimization method for truck-drone integrated rescue vehicles in forest firefighting includes the following steps:

step S1: collecting the data of disaster sites caused by forest fires, calculating transportation time on road and flight time from disaster relief site to disaster sites and the transportation time among different disaster sites according to the data of the disaster sites, and get the transportation time data of post-disaster relief;

step S2: based on the disaster site data, transportation time data, and an amount of relief supplies that can be allocated to disaster relief sites in step S1, constructing a mathematical model of the truck-drone based vehicle routing problem to minimize the impact of the disaster;

step S3: solving the mathematical model of the truck-drone based vehicle routing problem in step S2 by an optimization algorithm, and a post-disaster rescue route of the truck-drone integrated rescue vehicle is specified according to the solution results.

Preferably, step S1 includes:

step S11: collecting the data on disaster sites caused by forest fires. The data of disaster sites include a total number, locations, severity, and surrounding road conditions of each disaster site.

step S12: according to the disaster severity of each disaster site, assessing and calculating the amount of relief supplies required for each disaster site.

step S13: through a GPS and navigation system, the data of surrounding road condition of each disaster site and location data of the disaster relief site, calculating the transportation time on road and flight time data from the disaster relief site to each disaster site and the transportation time among different disaster sites according to the location data of each disaster site.

Preferably, step S2 includes:

step S21: constructing a drone-vehicle routing optimization model to minimize the disaster impact degree. The objective function formula is as follows:

$$\text{Min}\left(\sum_{i\in N_1} q_i z_i + \sum_{i\in N\backslash N_0} q_i \bar{z}_i\right),\qquad(1)$$

among them, $q_i$ is a demand of disaster relief supplies in each disaster site, where $i\in N$, $N$ is a set of disaster relief site and disaster sites; $z_i$, is a decision variable, that is, the arrival time of the truck-drone integrated rescue vehicle on location i, where $i\in N_1$, and $N_1$ is a set of affected points where the surrounding roads are not damaged; $\bar{z}_i$ is a decision variable, that is, the arrival time of drone on location i, where $i\in N\backslash N_0$, $N$ is a set of disaster relief site and disaster sites, and $N_0$ is a set of the disaster relief sites;

constraint functions such as formulas (2)-(26):

$$\sum_{\substack{j\in N\backslash N_2\\ j\neq i}} x_{ij} = \sum_{\substack{j\in N\backslash N_2\\ j\neq i}} x_{ji},\qquad(2)$$

$$\forall i\in N\backslash N_2,$$

among them, $x_{ij}$ is a decision variable, that is, if the truck-drone integrated rescue vehicle drives from location i to location j, the value is 1, otherwise, the value is 0, where $i\in N\backslash N_2$, $j\in N\backslash N_2$, $N$ is a set of disaster relief site and disaster sites, $N=N_0\cup N_1\cup N_2$, $N_0$ is a set of the disaster relief site, $N_1$ is a set of affected points where the surrounding roads are not damaged, $N_2$ is a set of affected points where the surrounding roads are damaged; $x_{ji}$ is a decision variable, that is, if the truck-drone integrated rescue vehicle drives from location j to location i, the value is 1, otherwise, the value is 0, where $i\in N\backslash N_2$, $j\in N\backslash N_2$, $N$ is a set of disaster relief site and disaster sites, $N=N_0\cup N_1\cup N_2$, $N_0$ is a set of the disaster relief site, $N_1$ is a set of affected points where the surrounding roads are not damaged, $N_2$ is a set of affected points where the surrounding roads are damaged;

$$\sum_{\substack{j\in N\backslash N_2\\ j\neq i}} x_{ij} \leq 1,\qquad(3)$$

$$\forall i\in N_1,$$

$$\sum_{\substack{j\in N_1\\ j\neq i}} x'_{ij} \leq x_{i,N_0},\qquad(4)$$

$$\forall i\in N_1,$$

$$\sum_{\substack{j\in N_1\\ i\neq j}} x'_{ij} \leq x_{N_0,j},\qquad(5)$$

4

-continued $$\forall j\in N_1,$$

$$\sum_{j\in N_1} x_{N_0,j} - \sum_{i\in N_1}\sum_{\substack{j\in N_1\\ j\neq i}} x'_{i,j} \leq K,\qquad(6)$$

among them, $$x'_{ij}$$

is a decision variable, that is, if the truck-drone integrated rescue vehicle drives from location i to the disaster relief site $N_0$ then to location j, the value is 1, otherwise, the value is 0, $i\in N_1$, $j\in N_1$, $x_{i,N_0}$ is a decision variable, that is, if the truck-drone integrated rescue vehicle drives from location i to the disaster relief site, the value is 1, otherwise the value is 0. $x_{N_0,j}$ is a decision variable, that is, if the truck-drone integrated rescue vehicle drives from the disaster relief site to location j, the value is 1, otherwise, the value is 0, K is the number of truck-drone integrated rescue vehicles parked at the disaster relief site;

$$z_i + t_{ij} + w_i + s_i - M(1 - x_{ij}) \leq z_j,\qquad(7)$$

$$\forall i\in N\backslash N_2,$$

$$j\in N\backslash N_2,$$

$$i\neq j,$$

among them, $z_i$ is a decision variable, that is, the time node when the truck-drone integrated rescue vehicle reaches location i, where $i\in N\backslash N_2$, among them, $z_j$ is a decision variable, that is, the time node when the truck-drone integrated rescue vehicle reaches location i, where $j\in N\backslash N_2$, $t_{ij}$ is a travel time of the truck-drone integrated rescue vehicle from location i to location j, where $i\in N\backslash N_2$, $j\in N\backslash N_2$ $w_i$ is a decision variable, that is, a waiting time of the truck-drone integrated rescue vehicle at location i, where $i\in N\backslash N_2$; $s_i$ is a rescue time at each disaster site i, and it is assumed that the rescue time is linearly increasing with the demand, namely $s_i=\alpha q_i$, where $\alpha$ is a proportional coefficient $i\in N\backslash N_2$; M is a constraint parameter, that is, a large positive number, which is used to limit the range of variables in the constraint, and can be set to 100000 in the embodiment. $x_{ij}$ is a decision variable, that is, whether the truck-drone integrated rescue vehicle drives from location i to location j, the value is 1, otherwise, the value is 0, where $i\in N\backslash N_2$, $j\in N\backslash N_2$;

$$\sum_{\substack{j\in N\backslash N_0\\ j\neq i}}\sum_{r\in U}(\bar{t}_{ij} + s_j + \bar{t}_{ji})f_{ij}^{ur} \leq w_i,\qquad(8)$$

$$\forall i\in N_1,$$

$$u\in U,$$

among them, $\bar{t}_{ij}$ is a flight time of the drone from location i to location j, where $i\in N_1$, $j\in N\backslash N_0$, $\bar{t}_{ij}$ is a flight time of the drone from location j to location i, where $i\in N_1$, $j \in \mathbb{N} \backslash N_0$; $s_j$ is a rescue time at each disaster site j, and it is assumed that the rescue time is linearly increasing with the demand, that is, $s_j = \alpha g_j$, where $\alpha$ is a proportional coefficient $j \in \mathbb{N} \backslash N_0$;

$$f_{ij}^{ur}$$

is a decision variable, that is, if the truck-drone integrated rescue vehicle stays at location i and uses the r th trip of the drone u to rescue location j, the value is 1, otherwise the value is 0, $i \in N_1$, $j \in \mathbb{N} \backslash N_0$, $u \in U$, $u \in R$; $w_i$ is a decision variable, that is, a waiting time of the truck-drone integrated rescue vehicle at location i, where $i \in N_1$;

$$z_i + \bar{t}_{ij} - M(1 - f_{ij}^{ur}) + \sum_{\substack{j' \in \mathbb{N} \backslash N_0 \\ j' \neq j}} \sum_{\substack{r' \in R \\ r' < r}} (\bar{t}_{ij'} + s_{j'} + \bar{t}_{j'i}) f_{ij'}^{ur'} \leq z_j, \qquad (9)$$

$$\forall\, i \in N_1,$$
$$j \in \mathbb{N} \backslash N_0,$$
$$i \neq j,$$
$$u \in U,$$
$$r \in R,$$

among them, $\bar{t}_{ij'}$ is a flight time of the drone from location i to position point j', where $i \in N_1$, $j' \in \mathbb{N} \backslash N_0$; $\bar{t}_{j'i}$ is a flight time of the drone from position point j' to location i, where $i \in N_1$, $j' \in \mathbb{N} \backslash N_0$; $s_{j'}$ is a rescue time at each disaster site j', and it is assumed that the rescue time is linearly increasing with the demand, that is, $s_j = \alpha q_{j'}$, where $\alpha$ is a proportional coefficient $j \in \mathbb{N} \backslash N_0$;

$$f_{ij}^{ur'}$$

is a decision variable, that is, if the truck-drone integrated rescue vehicle stays at location i and uses the r' th trip of the drone u to rescue location j, the value is 1, otherwise the value is 0, $i \in N_1$, $j' \in \mathbb{N} \backslash N_0$, $u \in U$, $r' \in R$; $\bar{z}_j$ is a decision variable, that is, the time node of the truck-drone integrated rescue vehicle at location i, where $j \in \mathbb{N} \backslash N_0$;

$$\sum_{\substack{j \in \mathbb{N} \backslash N_0 \\ j \neq i}} f_{ij}^{ur} \geq \sum_{\substack{j \in \mathbb{N} \backslash N_0 \\ j \neq i}} f_{ij}^{u,r+1}, \qquad (10)$$

$$\forall\, i \in N_1,$$
$$u \in U,$$
$$r \in R,$$

among them, $$f_{ij}^{u,r+1}$$

is a decision variable, that is, whether the truck-drone integrated rescue vehicle stays at location i and uses the r+1th trip of the drone u to rescue location j, the value is 1, otherwise, the value is 0, $i \in N_1$, $j \in \mathbb{N} \backslash N_0$, $u \in U$, $u \in R$; U is a number of drones equipped for each truck-drone integrated rescue vehicle; R is the maximum number of take-offs per drone;

$$\sum_{\substack{i \in N_1 \\ i \neq j}} \sum_{u \in U} \sum_{r \in R} f_{ij}^{ur} + \sum_{\substack{i \in \mathbb{N} \backslash N_2 \\ i \neq j}} x_{ij} = 1, \qquad (11)$$

$$\forall\, j \in N_1,$$

$$\sum_{i \in N_1} \sum_{u \in U} \sum_{r \in R} f_{ij}^{ur} = 1, \qquad (12)$$

$$\forall\, j \in N_2,$$

$$\sum_{\substack{j \in \mathbb{N} \backslash N_0 \\ j \neq i}} f_{ij}^{ur} \leq 1, \qquad (13)$$

$$\forall\, i \in N_1,$$
$$u \in U,$$
$$r \in R,$$
$$(\bar{t}_{ij} + s_j + \bar{t}_{ji}) f_{ij}^{ur} \leq T_{max}, \qquad (14)$$
$$\forall\, i \in N_1,$$
$$j \in \mathbb{N} \backslash N_0,$$
$$i \neq j$$
$$u \in U,$$
$$r \in R,$$

among them, $T_{max}$ is the maximum time that the drone flies each takeoff, $\bar{t}_{ji}$ is a flight time of the drone from location j to location i, where $i \in N_1$, $j \in \mathbb{N} \backslash N_0$;

$$\sum_{\substack{j \in \mathbb{N} \backslash N_0 \\ j \neq i}} \sum_{u \in U} \sum_{r \in R} f_{ij}^{ur} \leq M\, y_i, \qquad (15)$$

$$(M = U \times R),$$

$$\forall\, i \in N_1,$$

among them, $y_i$ is a decision variable, that is, if the truck-drone integrated rescue vehicle stays at position i and at least carries out one drone rescue work, the value is 1, otherwise, the value is 0, $i \in N_1$;

$$\sum_{\substack{i \in \mathbb{N} \backslash N_2 \\ i \neq j}} x_{ij} \geq y_j, \forall\, j \in N_1, \qquad (16)$$

$$\sum_{\substack{j \in N_1 \\ j \neq i}} c_{ij} - \sum_{\substack{j \in N_1 \\ j \neq i}} c_{ij} = q_i + \sum_{\substack{j \in \mathbb{N} \backslash N_0 \\ j \neq i}} (1 - f_{ij}^{ur}) q_j, \forall\, i \in N_1, \qquad (17)$$

among them, $c_{ij}$ is a decision variable, which is the amount of relief supplies loaded by the truck-drone integrated rescue vehicle from location i to location j, $i \in \mathbb{N} \backslash N_2$, $j \in \mathbb{N} \backslash N_2$; $c_{ji}$ is a decision variable, the amount of relief supplies loaded by the truck-drone integrated rescue vehicle from location j to location i, i∈ $\mathbb{N}\backslash N_2$, j∈ $\mathbb{N}\backslash N_2$; $q_j$ is a demand of disaster relief supplies for location j, where j∈ $\mathbb{N}\backslash N_0$;

$$c_{ij} \le Qx_{ij}, \forall\, i \in \mathbb{N}\backslash N_2, j \in \mathbb{N}\backslash N_2, \tag{18}$$

among them, Q is the maximum loading capacity of the truck-drone integrated rescue vehicle.

$$\sum_{j\in N-1} c_{N_0,j} = \sum_{i\in\mathbb{N}\backslash N_0} q_i, \tag{19}$$

among them, $c_{N_0,j}$ is a decision variable, which is the amount of relief supplies loaded by the truck-drone integrated rescue vehicle running from the disaster relief site to location j;

$$x_{ij} = \{0, 1\}, \forall\, i \in \mathbb{N}\backslash N_2, j \in \mathbb{N}\backslash N_2, \tag{20}$$

$$x'_{ij} = \{0, 1\}, \forall\, i \in N_1, j \in N_1, \tag{21}$$

$$y_i = \{0, 1\}, \forall\, i \in N_1, \tag{22}$$

$$\int_{ij}^{ur} = \{0, 1\}, \forall\, i \in N_1, j \in \mathbb{N}\backslash N_0, u \in U, r \in R, \tag{23}$$

$$c_{ij} \ge 0_{and\ ia\ an\ integer} \forall\, i \in \mathbb{N}\backslash N_2, j \in \mathbb{N}\backslash N_2, \tag{24}$$

$$z_i, w_i \ge 0, \forall\, i \in N_1, \tag{25}$$

$$z_i, 0, \forall\, i \in \mathbb{N}\backslash N_0 \tag{26}$$

step S22: inputting the data in step S12 and step S13 to the model in step S21, that is, the amount of relief supplies required for each disaster site, the transportation time on road, and flight time data from the disaster relief site to each disaster site and the transportation time among different disaster sites;

step S23: in the model of step S21, inputting the data on the amount of relief supplies that can be allocated in the disaster relief site.

The amount of relief supplies allocated includes the total amount of relief supplies in the disaster relief site and the total number of available truck-drone integrated rescue vehicles and drones equipped for each vehicle.

Preferably, the optimization algorithm in step S3 is a branch-and-bound algorithm, a branch-and-price algorithm, or a branch-price-and-cut algorithm that can solve the mixed integer programming model in step S21.

Therefore, the invention adopts the routing optimization method for truck-drone integrated rescue vehicles in forest firefighting with the following beneficial effects:

(1) Based on the theory of truck-drone based vehicle routing problem, an truck-drone integrated rescue vehicle routing problem model with different rescue road conditions as the premise and disaster impact as the goal is constructed, which minimizes the impact of sudden natural disasters.

(2) Allowing drone rescue forces to be able to simultaneously respond to affected points with different road transport conditions reduces disaster response while improving the efficiency of post-disaster disposal and rescue.

(3) Considering the situation that the truck-drone integrated rescue vehicle returns to the disaster relief site and then rescues, the rescue efficiency of the truck-drone integrated rescue vehicle is further improved.

The following is a further detailed description of the technical scheme of the invention through drawings and embodiment.

BRIEF DESCRIPTION OF THE DRAWINGS

FIG. 1 is a flow chart of the routing optimization method of the truck-drone integrated rescue vehicle in forest firefighting.

FIG. 2 is a schematic diagram of a set of the disaster relief site and the disaster site in the embodiment of the invention;

FIG. 3 is a schematic diagram of the post-disaster rescue route of the truck-drone integrated rescue vehicle in the embodiment of the invention.

DETAILED DESCRIPTION OF THE EMBODIMENTS

Embodiment

In order to make the purpose, technical scheme, and advantages of the embodiment of the invention more clear, the technical scheme will be described clearly and completely in combination with the drawings in the embodiment of the invention. Obviously, the described embodiment is part of the embodiments of the invention, not all of the embodiments. The components in the embodiment of the present invention, which are usually described and shown in the figures attached here, can be arranged in various configurations for settings and designs.

Therefore, the following detailed description of the embodiment provided in the accompanying figures is not intended to limit the protection scope of the invention, but only to represent the selected embodiment.

The following is a detailed description of the implementation of the invention in combination with the attached drawings.

As shown in FIG. 1, a routing optimization method for truck-drone integrated rescue vehicles in forest firefighting includes the following steps:

step S1: the data of the disaster sites caused by forest fires are collected, the transportation time on road and flight time from the disaster relief site to the disaster sites and the transportation time among different disaster sites are calculated according to the data of the disaster sites, and get the transportation time data of post-disaster relief;

step S1 includes:

step S11: the data on disaster sites caused by forest fires are collected. The data of disaster sites include the total number, the location data, the severity, and the data of surrounding road condition of each disaster site;

step S12: according to the disaster severity of each disaster site, the amount of relief supplies required for each disaster site is assessed and calculated.

step S13: through a GPS and navigation system, the data of surrounding road condition of each disaster site and the location data of the disaster relief site, the transportation time on road and flight time data from the disaster relief site to each disaster site and the transportation time among different disaster sites are calculated according to the location data of each disaster site;

step S2: based on the disaster site data, transportation time data, and the amount of relief supplies that can be allocated to disaster relief sites in step S1, a mathematical model of the truck-drone based vehicle routing problem is constructed to minimize the impact of the disaster;

step S2 includes:

step S21: the drone-vehicle routing optimization model is constructed to minimize the disaster impact degree. The objective function formula is as follows:

$$\text{Min}\left(\sum_{j\in N_I} q_i z_i + \sum_{i\in N\backslash N_0} q_i \bar{z}_i\right), \tag{1}$$

among them, $q_i$ is a demand of disaster relief supplies in each disaster site, where $i\in N$, $N$ is a set of disaster relief site and disaster sites; $z_i$ is a decision variable, that is, the arrival time of the truck-drone integrated rescue vehicle on location i, where $i\in N_1$, and $N_1$ is a set of affected points where the surrounding roads are not damaged; $\bar{z}_i$ is a decision variable, that is, the arrival time of drone on location i, where $i\in N\backslash N_0$, $N$ is a set of disaster relief site and disaster sites, and $N_0$ is a set of the disaster relief sites;

constraint functions such as formulas (2)-(26):

$$\sum_{\substack{j\in N\backslash N_2 \\ j\neq i}} x_{ij} = \sum_{\substack{j\in N\backslash N_2 \\ j\neq i}} x_{ji}, \forall\, i \in N\backslash N_2, \tag{2}$$

among them, $x_{ij}$ is a decision variable, that is, if the truck-drone integrated rescue vehicle drives from location i to location j, the value is 1, otherwise, the value is 0, where $i\in N\backslash N_2$, $j\in N\backslash N_2$, $N$ is a set of disaster relief site and disaster sites, $N=N_0\cup N_1\cup N_2$, $N_0$ is a set of the disaster relief site, $N_1$ is a set of affected points where the surrounding roads are not damaged, $N_2$ is a set of affected points where the surrounding roads are damaged; $x_{ji}$ is a decision variable, that is, if the truck-drone integrated rescue vehicle drives from location j to location i, the value is 1, otherwise, the value is 0, where $i\in N\backslash N_2$, $j\in N\backslash N_2$, $N$ is a set of disaster relief site and disaster sites, $N=N_0\cup N_1\cup N_2$, $N_0$ is a set of the disaster relief site, $N_1$ is a set of affected points where the surrounding roads are not damaged, $N_2$ is a set of affected points where the surrounding roads are damaged;

$$\sum_{\substack{j\in N\backslash N_2 \\ j\neq i}} x_{ij} \leq 1, \forall\, i \in N_1, \tag{3}$$

$$\sum_{\substack{j\in N_1 \\ j\neq i}} x'_{ij} \leq x_{i,N_0}, \forall\, i \in N_1, \tag{4}$$

$$\sum_{\substack{i\in N_1 \\ i\neq j}} x'_{ij} \leq x_{N_0,j}, \forall\, j \in N_1 \tag{5}$$

$$\sum_{j\in N_1} x_{N_0,j} - \sum_{\substack{i\in N_1 \\ j\neq i}}\sum_{j\in N_1} x'_{i,j} \leq K, \tag{6}$$

among them, $x'_{ij}$ is a decision variable, that is, if the truck-drone integrated rescue vehicle drives from location i to the disaster relief site $N_0$ then to location j, the value is 1, otherwise, the value is 0, $i\in N_1$, $j\in N_1$; $x_{i,N_0}$ is a decision variable, that is, if the truck-drone integrated rescue vehicle drives from location i to the disaster relief site, the value is 1, otherwise the value is 0; $x_{N_0,j}$ is a decision variable, that is, if the truck-drone integrated rescue vehicle drives from the disaster relief site to location j, the value is 1, otherwise, the value is 0, K is the number of truck-drone integrated rescue vehicles parked at the disaster relief site;

$$z_i + t_{ij} + w_i + s_i - M(1 - x_{ij}) \leq z_j, \forall\, i \in N\backslash N_2, j \in N\backslash N_2, i \neq j, \tag{7}$$

among them, $z_i$ is a decision variable, that is, the time node when the truck-drone integrated rescue vehicle reaches location i, where $i\in N\backslash N_2$, among them, $z_j$ is a decision variable, that is, the time node when the truck-drone integrated rescue vehicle reaches location i, where $j\in N\backslash N_2$; $t_{ij}$ is a travel time of the truck-drone integrated rescue vehicle from location i to location j. $w_i$ is a decision variable, that is, a waiting time of the truck-drone integrated rescue vehicle at location i, where $i\in N\backslash N_2$; $s_i$ is a rescue time at each disaster site i, and it is assumed that the rescue time is linearly increasing with the demand, namely $s_i=\alpha q_i$, where $\alpha$ is a proportional coefficient $i\in N\backslash N_2$; M is a constraint parameter, that is, a large positive number, which is used to limit the range of variables in the constraint, and can be set to 100000 in the embodiment. $x_{ij}$ is a decision variable, that is, whether the truck-drone integrated rescue vehicle drives from location i to location j, the value is 1, otherwise, the value is 0, where $i\in N\backslash N_2$, $j\in N\backslash N_2$;

$$\sum_{\substack{j\in N\backslash N_0 \\ j\neq i}}\sum_{r\in U}(\bar{t}_{ij} + s_j + \bar{t}_{ij})f_{ij}^{ur} \leq w_i, \forall\, i \in N_i, u \in U, \tag{8}$$

among them, $\bar{t}_{ij}$ is a flight time of the drone from location i to location j, where $i\in N_1$, $j\in N\backslash N_0$; $\bar{t}_{ji}$ is a flight time of the drone from location j to location i, where $i\in N_1$, $j\in N\backslash N_0$, $s_j$ is a rescue time at each disaster site j, and it is assumed that the rescue time is linearly increasing with the demand, that is, $s_j=\alpha q_j$, where $\alpha$ is a proportional coefficient $j\in N\backslash N_0$;

$$f_{ij}^{ur}$$

is a decision variable, that is, if the truck-drone integrated rescue vehicle stays at location i and uses the r th trip of the drone u to rescue location j, the value is 1, otherwise the value is 0, $i\in N_1$, $j\in N\backslash N_0$, $u\in U$, $u\in R$; $w_i$ that is, a waiting time of the truck-drone integrated rescue vehicle at location i, where $i\in N_1$;

$$z_i + \bar{t}_{ij} - M\left(1 - f_{ij}^{ur}\right) + \sum_{\substack{j'\in N\backslash N_0 \\ j\neq i}}\sum_{\substack{r'\in R \\ r'<r}}(\bar{t}_{ij'}s_{j'} + \bar{t}_{j'i})f_{ij'}^{ur'} \leq \bar{z}_j, \tag{9}$$

-continued $$\forall \, i \in N_1, \, j \in \mathbb{N}\backslash N_0, \, i \neq j, \, u \in U, \, r \in R,$$

among them, $\bar{t}_{ij'}$ is a flight time of the drone from location i to position point j', where $i \in N_1$, $j' \in \mathbb{N}\backslash N_0$; $\bar{t}_{j'i}$ is a flight time of the drone from position point j' to location i, where $i \in N_1$, $j' \in \mathbb{N}\backslash N_0$; $s_{j'}$ is a rescue time at each disaster site j', and it is assumed that the rescue time is linearly increasing with the demand, that is, $s_{j'} = \alpha q_{j'}$, where $\alpha$ is a proportional coefficient $j \in \mathbb{N}\backslash N_0$;

$$f_{ij'}^{ur'}$$

is a decision variable, that is, if the truck-drone integrated rescue vehicle stays at location i and uses the r' th trip of the drone u to rescue location j, the value is 1, otherwise the value is 0, $i \in N_1$, $j' \in \mathbb{N}\backslash N_0$, $u \in U$, $r' \in R$; $\bar{z}_j$ is a decision variable, that is, the time node of the truck-drone integrated rescue vehicle at location i, where $j \in \mathbb{N}\backslash N_0$;

$$\sum_{\substack{j \in \mathbb{N}\backslash N_0 \\ j \neq i}} f_{ij}^{ur} \geq \sum_{\substack{j \in \mathbb{N}\backslash N_0 \\ j \neq i}} f_{ij}^{u,r+1}, \, \forall \, i \in N-1, \, u \in U, \, r \in R, \tag{10}$$

among them, $$f_{ij}^{u,r+1}$$

is a decision variable, that is, whether the truck-drone integrated rescue vehicle stays at location i and uses the r+1th trip of the drone u to rescue location j, the value is 1, otherwise, the value is 0, $i \in N_1$, $j \in \mathbb{N}\backslash N_0$, $u \in U$, $u \in R$; U is a number of drones equipped for each truck-drone integrated rescue vehicle; R is the maximum number of take-offs per drone;

$$\sum_{\substack{i \in N_1 \\ i \neq j}} \sum_{u \in U} \sum_{r \in R} f_{ij}^{ur} + \sum_{\substack{j \in \mathbb{N}\backslash N_2 \\ i \neq j}} x_{ij} = 1, \, \forall \, j \in N_1, \tag{11}$$

$$\sum_{i \in N_1} \sum_{u \in U} \sum_{r \in R} f_{ij}^{ur} = 1, \, \forall \, j \in N_2, \tag{12}$$

$$\sum_{\substack{j \in \mathbb{N}\backslash N_0 \\ j \neq i}} f_{ij}^{ur} \leq 1, \, \forall \, i \in N_1, \, u \in U, \, r \in R, \tag{13}$$

$$(\bar{t}_{ij} + s_j + \bar{t}_{ij}) f_{ij}^{ur} \leq T_{max}, \, \forall \, i \in N_1, \, j \in \mathbb{N}\backslash N_0, \, i \neq j, \, u \in U, \, r \in R, \tag{14}$$

among them, $T_{max}$ is the maximum time that the drone flies each takeoff, $\bar{t}_{ji}$ is a flight time of the drone from location j to location i, where $i \in N_1$, $j \in \mathbb{N}\backslash N_0$;

$$\sum_{\substack{j \in \mathbb{N}\backslash N_0 \\ j \neq i}} \sum_{u \in U} \sum_{r \in R} f_{ij}^{ur} \leq M \, y_i, \, (M = U \times R), \, \forall \, i \in N_1, \tag{15}$$

among them, $y_i$ is a decision variable, that is, if the truck-drone integrated rescue vehicle stays at position i and at least carries out one drone rescue work, the value is 1, otherwise, the value is 0, $i \in N_1$;

$$\sum_{\substack{j \in \mathbb{N}\backslash N_2 \\ i \neq j}} x_{ij} \geq y_j, \, \forall \, j \in N_1, \tag{16}$$

$$\sum_{\substack{j \in N_1 \\ j \neq i}} c_{ij} - \sum_{\substack{j \in N_1 \\ j \neq i}} c_{ji} = q_i + \sum_{\substack{j \in \mathbb{N}\backslash N_0 \\ j \neq i}} (1 - f_{ij}^{ur}) q_j, \, \forall \, i \in N_1, \tag{17}$$

among them, $c_{ij}$ is a decision variable, which is the amount of relief supplies loaded by the truck-drone integrated rescue vehicle from location i to location j, $i \in \mathbb{N}\backslash N_2$, $j \in \mathbb{N}\backslash N_2$; $c_{ji}$ is a decision variable, the amount of relief supplies loaded by the truck-drone integrated rescue vehicle from location j to location i, $i \in \mathbb{N}\backslash N_2$, $j \in \mathbb{N}\backslash N_2$; $q_j$ is a demand of disaster relief supplies for location j, where $j \in \mathbb{N}\backslash N_0$;

$$c_{ij} \leq Q x_{ij}, \, \forall \, i \in \mathbb{N}\backslash N_2, \, j \in \mathbb{N}\backslash N_2, \tag{18}$$

among them, Q is the maximum loading capacity of the truck-drone integrated rescue vehicle;

$$\sum_{j \in N_1} c_{N_0 j} = \sum_{i \in \mathbb{N}\backslash N_0} q_i, \tag{19}$$

among them, $c_{N_0 j}$ is a decision variable, which is the amount of relief supplies loaded by the truck-drone integrated rescue vehicle running from the disaster relief site to location j;

$$x_{ij} = \{0, 1\}, \, \forall \, i \in \mathbb{N}\backslash N_2, \, j \in \mathbb{N}\backslash N_2, \tag{20}$$

$$x'_{ij} = \{0, 1\}, \, \forall \, i \in N_1, \, j \in N_1, \tag{21}$$

$$y_i = \{0, 1\}, \, \forall \, i \in N_1, \tag{22}$$

$$f_{ij}^{ur} = \{0, 1\}, \, \forall \, i \in N_1, \, j \in \mathbb{N}\backslash N_0, \, u \in U, \, r \in R, \tag{23}$$

$$c_{ij} \geq 0_{and \, is \, an \, integer} \forall \, i \in \mathbb{N}\backslash N_2, \, j \in \mathbb{N}\backslash N_2, \tag{24}$$

$$z_i, w_i \geq 0, \, \forall \, i \in N_1, \tag{25}$$

$$z_i \geq 0, \, \forall \, i \in \mathbb{N}\backslash N_0 \tag{26}$$

step S22: the data in step S12 and step S13 to the model of step S21 are inputted, that is, the amount of relief supplies required for each disaster site, the transportation time on road, and flight time data from the disaster relief site to each disaster site and the transportation time among different disaster sites;

step S23: In the model of step S21, the data on the amount of relief supplies that can be allocated in the disaster relief site are inputted. The amount of relief supplies allocated includes the total amount of relief supplies in the disaster relief site and the total number of available truck-drone integrated rescue vehicles and drones equipped for each vehicle;

step S3: The mathematical model of the truck-drone based vehicle routing problem in step S2 is solved by the optimization algorithm, and the post-disaster rescue route of the truck-drone integrated rescue vehicle is specified according to the solution results. the optimization algorithm in step S3 is a branch-and-bound algorithm, a branch-and-price algorithm, or a branch-price-and-cut algorithm that can solve the mixed integer programming model in step S21.

Finally, it should be noted that the above embodiment is only used to explain the technical scheme of the invention rather than to restrict it. Although the invention is described in detail concerning the better embodiment, ordinary technicians in this field should understand that they can still modify or replace the technical scheme of the invention, and these modifications or equivalent replacements cannot make the modified technical scheme out of the spirit and scope of the technical scheme of the invention.

What is claimed is:

1. A routing optimization method for truck-drone integrated rescue vehicles in forest firefighting, comprising the following steps:

step S1: collecting data of disaster sites caused by forest fires, calculating transportation time on road and flight time from disaster relief site to the disaster sites and the transportation time among different disaster sites according to the data of the disaster sites, and getting the transportation time data of post-disaster relief;

step S2: based on the disaster site data, transportation time data, and an amount of relief supplies that can be allocated to disaster relief sites in step S1, constructing a mathematical model of a truck-drone based vehicle routing problem to minimize an impact of a disaster; and step S3: solving the mathematical model of the truck-drone based vehicle routing problem in step S2 by an optimization algorithm, and specifying a post-disaster rescue route of the truck-drone integrated rescue vehicle according to solution results.

2. The routing optimization method for truck-drone integrated rescue vehicles in forest firefighting according to claim 1, wherein step S1 comprises:

step S11: collecting the data on disaster sites caused by the forest fires, wherein the data of disaster sites comprise a total number, locations, severity, and surrounding road conditions of each disaster site;

step S12: according to the disaster severity of each disaster site, assessing and calculating the amount of relief supplies required for each disaster site; and step S13: through a GPS and navigation system, calculating the data of surrounding road condition of each disaster site and the location data of the disaster relief site, the transportation time on road and flight time data from the disaster relief site to each disaster site and the transportation time among different disaster sites according to the location data of each disaster site.

3. The routing optimization method for truck-drone integrated rescue vehicles in forest firefighting according to claim 2, wherein step S2 comprises:

step S21: constructing a drone-vehicle routing optimization model to minimize a disaster impact degree;

step S22: inputting the data in step S12 and step S13 to the model in step S21, that is, the amount of relief supplies required for each disaster site, the transportation time on road, and flight time data from the disaster relief site to each disaster site and the transportation time among different disaster sites; and step S23: in the model of step S21, inputting the data on the amount of relief supplies that can be allocated in the disaster relief site, wherein the amount of relief supplies allocated comprises a total amount of relief supplies in the disaster relief site and a total number of available truck-drone integrated rescue vehicles and drones equipped for each vehicle.

4. The routing optimization method for truck-drone integrated rescue vehicles in forest firefighting according to claim 3, wherein an objective function formula in step S21 is as follows:

$$\text{Min}\left(\sum_{i \in N_1} q_i z_i + \sum_{i \in N \backslash N_0} q_i \bar{z}_i\right), \tag{1}$$

wherein $q_i$ is a demand for disaster relief supplies in each disaster site, where $i \in N$, $N$ is a set of disaster relief site and disaster sites; $z_i$ is a decision variable, that, is, a arrival time of the truck-drone integrated rescue vehicle on location i, wherein $i \in N_1$, and $N_1$ is a set of affected points where the surrounding roads are not damaged; $\bar{z}_i$ is a decision variable, that is, a arrival time of drone on location i, wherein $i \in N \backslash N_0$, $N$ is a set of disaster relief site and disaster sites, and $N_0$ is a set of the disaster relief sites;

constraint functions such as formulas (2)-(26):

$$\sum_{\substack{j \in N \backslash N_2 \\ j \neq i}} x_{ij} = \sum_{\substack{j \in N \backslash N_2 \\ j \neq i}} x_{ji}, \forall\, i \in N \backslash N_2, \tag{2}$$

wherein $x'_{ij}$ is a decision variable, that is, if the truck-drone integrated rescue vehicle drives from location i to location j, the value is 1, otherwise, the value is 0, wherein $i \in N \backslash N_2$, $j \in N \backslash N_2$, $N$ is a set of disaster relief site and disaster sites, $N = N_0 \cup N_1 \cup N_2$, $N_0$ is a set of the disaster relief sites, $N_1$ is a set of affected points where the surrounding roads are not damaged, $N_2$ is a set of affected points where the surrounding roads are damaged; $x_{ji}$ is a decision variable, that is, if the truck-drone integrated rescue vehicle drives from location j to location i, the value is 1, otherwise, the value is 0, wherein $i \in N \backslash N_2$, $j \in N \backslash N_2$, $N$ is a set of disaster relief site and disaster sites, $N = N_0 \cup N_1 \cup N_2$, $N_0$ is a set of the disaster relief sites, $N_1$ is a set of affected points where the surrounding roads are not damaged, $N_2$ is a set of affected points where the surrounding roads are damaged;

$$\sum_{\substack{j \in N \backslash N_2 \\ j \neq i}} x_{ij} \leq 1, \forall\, i \in N_1, \tag{3}$$

$$\sum_{\substack{j \in N_1 \\ j \neq i}} x'_{ij} \leq x_{i,N_0}, \forall\, i \in N_1, \tag{4}$$

$$\sum_{\substack{i \in N_1 \\ i \neq j}} x'_{ij} \leq x_{N_0,j}, \forall\, j \in N_1, \tag{5}$$

$$\sum_{j \in N_1} x_{N_0,j} - \sum_{i \in N_1} \sum_{\substack{j \in N_1 \\ j \neq i}} x'_{i,j} \leq K, \tag{6}$$

wherein $x'_{ij}$ is a decision variable, that is, if the truck-drone integrated rescue vehicle drives from location i to the disaster relief site $N_0$ then to location j, the value is 1, otherwise, the value is 0, $i \in N_1$, $j \in N_1$, $x_{i,N_0}$ is a decision variable, that is, if the truck-drone integrated rescue vehicle drives from location i to the disaster relief site, the value is 1, otherwise the value is 0, $x_{N_0,j}$ is a decision variable, that is, if the truck-drone integrated rescue vehicle drives from the disaster relief site to location j, the value is 1, otherwise, the value is 0, K is a number of truck-drone integrated rescue vehicles parked at the disaster relief site;

$$z_i + t_{ij} + w_i + s_i - M(1 - x_{ij}) \le z_j, \forall i \in \mathbb{N} \backslash N_2, j \in \mathbb{N} \backslash N_2, i \ne j, \qquad (7)$$

wherein $z_i$ is a decision variable, that is, the time node when the truck-drone integrated rescue vehicle reaches location i, wherein $i \in \mathbb{N} \backslash N_2$, $z_j$ is a decision variable, that is, the time node when the truck-drone integrated rescue vehicle reaches location j, wherein $j \in \mathbb{N} \backslash N_2$, $t_{ij}$ is a travel time of the truck-drone integrated rescue vehicle from location i to location j, $w_i$ is a decision variable, that is, a waiting time of the truck-drone integrated rescue vehicle at location i, wherein $i \in \mathbb{N} \backslash N_2$; $s_i$ is a rescue time at each disaster site i, and it is assumed that the rescue time is linearly increasing with the demand, namely $s_i = \alpha q_i$, wherein $\alpha$ is a proportional coefficient $i \in \mathbb{N} \backslash N_2$; M is a constraint parameter, that is, a large positive number, which is used to limit the range of variables in the constraint, and can be set to 100000 in the embodiment, $x_{ij}$ is a decision variable, that is, whether the truck-drone integrated rescue vehicle drives from location i to location j, the value is 1, otherwise, the value is 0, wherein $i \in \mathbb{N} \backslash N_2$, $j \in \mathbb{N} \backslash N_2$;

$$\sum_{\substack{j \in \mathbb{N} \backslash N_0 \\ j \ne i}} \sum_{r \in U} (\bar{t}_{ij} + s_j + \bar{t}_{ji}) f_{ij}^{ur} \le w_i, \forall i \in N_1, u \in U, \qquad (8)$$

wherein $\bar{t}_{ij}$ is a flight time of the drone from location i to location j, wherein $i \in N_1, j \in \mathbb{N} \backslash N_0$; $\bar{t}_{ji}$ is a flight time of the drone from location j to location i, wherein $i \in N_1$, $j \in \mathbb{N} \backslash N_0$, $s_j$ is a rescue time at each disaster site j, and it is assumed that the rescue time is linearly increasing with the demand, that is, $s_j = \alpha q_j$, wherein $\alpha$ is a proportional coefficient $j \in \mathbb{N} \backslash N_0$;

$$f_{ij}^{ur}$$

is a decision variable, that is, if the truck-drone integrated rescue vehicle stays at location i and uses the r th trip of the drone u to rescue location j, the value is 1, otherwise the value is 0, $i \in N_1, j \in \mathbb{N} \backslash N_0, u \in U, u \in R$; $w_i$ is a decision variable, that is, a waiting time of the truck-drone integrated rescue vehicle at location i, wherein $i \in N_1$;

$$z_i + \bar{t}_{ij} - M\left(1 - f_{ij}^{ur}\right) + \sum_{\substack{j' \in \mathbb{N} \backslash N_0 \\ j' \ne j}} \sum_{\substack{r' \in R \\ r' < r}} (\bar{t}_{ij'} + s_{j'} + \bar{t}_{j'i}) f_{ij'}^{ur'} \le \bar{z}_j, \qquad (9)$$

$$\forall i \in N_1, j \in \mathbb{N} \backslash N_0, i \ne j, u \in U, r \in R, \qquad 65$$

wherein $\bar{t}_{ij'}$ is a flight time of the drone from location i to position point, j', wherein $i \in N_1, j' \in \mathbb{N} \backslash N_0$; $\bar{t}_{j'i}$ is a flight time of the drone from position point j' to location i, wherein $i \in N_1$, $j' \in \mathbb{N} \backslash N_0$; $s_{j'}$ is a rescue time at each disaster site, j', and it is assumed that the rescue time is linearly increasing with the demand, that is, $s_{j'} = \alpha q_{j'}$, wherein $\alpha$ is a proportional coefficient $j \in \mathbb{N} \backslash N_0$;

$$f_{ij'}^{ur'}$$

is a decision variable, that is, if the truck-drone integrated rescue vehicle stays at location i and uses the r' th trip of the drone u to rescue location j', the value is 1, otherwise the value is 0, $i \in N_1, j' \in \mathbb{N} \backslash N_0, u \in U, r' \in R$; $\bar{z}_j$ is a decision variable, that is, the time node of the truck-drone integrated rescue vehicle at location i, wherein $j \in \mathbb{N} \backslash N_0$, $$\sum_{\substack{j \in \mathbb{N} \backslash N_0 \\ j \ne i}} f_{ij}^{ur} \ge \sum_{\substack{j \in \mathbb{N} \backslash N_0 \\ j \ne i}} f_{ij}^{u,r+1}, \forall i \in N_1, u \in U, r \in R, \qquad (10)$$

wherein $$f_{ij}^{u,r+1}$$

is a decision variable, that is, whether the truck-drone integrated rescue vehicle stays at location i and uses the r+1th trip of the drone u to rescue location j, the value is 1, otherwise, the value is 0, $i \in N_1, j \in \mathbb{N} \backslash N_0, u \in U$, $u \in R$; U is a number of drones equipped for each truck-drone integrated rescue vehicle; R is the maximum number of take-offs per drone;

$$\sum_{\substack{i \in N_1 \\ i \ne j}} \sum_{u \in U} \sum_{r \in R} f_{ij}^{ur} + \sum_{\substack{i \in \mathbb{N} \backslash N_2 \\ i \ne j}} x_{ij} = 1, \forall j \in N_1, \qquad (11)$$

$$\sum_{i \in N_1} \sum_{u \in U} \sum_{r \in R} f_{ij}^{ur} = 1, \forall j \in N_2, \qquad (12)$$

$$\sum_{\substack{j \notin \mathbb{N} \backslash N_0 \\ j \ne i}} f_{ij}^{ur} \le 1, \forall i \in N_1, u \in U, r \in R, \qquad (13)$$

$$(\bar{t}_{ij} + s_j + \bar{t}_{ji}) f_{ij}^{ur} \le T_{max}, \forall i \in N_1, j \in \mathbb{N} \backslash N_0, i \ne j, u \in U, r \in R, \qquad (14)$$

max $T_{max}$ is the maximum time that the drone flies each takeoff, $\bar{t}_{ji}$ is a flight time of the drone from location j to location i, wherein $i \in N_1, j \in \mathbb{N} \backslash N_0$;

$$\sum_{\substack{j \in \mathbb{N} \backslash N_0 \\ j \ne i}} \sum_{u \in U} \sum_{r \in R} f_{ij}^{ur} \le M \, y_i, (M = U \times R), \forall i \in N_1, \qquad (15)$$

wherein $y_i$ is a decision variable, that is, if the truck-drone integrated rescue vehicle stays at position i and at least carries out one drone rescue work, the value is 1, otherwise, the value is 0, $i \in N_1$;

$$\sum_{\substack{i\in \mathbb{N}\backslash N_2 \\ i\neq j}} x_{ij} \geq y_j, \ \forall \ j \in N_1, \tag{16}$$

$$\sum_{\substack{j\in N_1 \\ j\neq i}} c_{ij} - \sum_{\substack{j\in N_1 \\ j\neq i}} c_{ji} = q_i + \sum_{\substack{j\in \mathbb{N}\backslash N_0 \\ j\neq i}} \left(1 - f_{ij}^{ur}\right)q_j, \ \forall \ i \in N_1, \tag{17}$$

wherein $c_{ij}$ is a decision variable, which is the amount of relief supplies loaded by the truck-drone integrated rescue vehicle from location i to location j, i$\in \mathbb{N}\backslash N_2$, j$\in \mathbb{N}\backslash N_2$; $c_{ji}$ is a decision variable, the amount of relief supplies loaded by the truck-drone integrated rescue vehicle from location j to location i, i$\in \mathbb{N}\backslash N_2$, j$\in \mathbb{N}\backslash N_2$; $q_j$ is a demand of disaster relief supplies for location j, wherein j$\in \mathbb{N}\backslash N_0$;

$$c_{ij} \leq Q\,x_{ij}, \ \forall \ i \in \mathbb{N}\backslash N_2, \ j \in \mathbb{N}\backslash N_2, \tag{18}$$

wherein Q is the maximum loading capacity of the truck-drone integrated rescue vehicle;

$$\sum_{j\in N_1} c_{N_0,j} = \sum_{i\in \mathbb{N}\backslash N_0} q_i, \tag{19}$$

wherein $c_{N_0,j}$ is a decision variable, which is the amount of relief supplies loaded by the truck-drone integrated rescue vehicle running from the disaster relief site to location j;

$$x_{ij} = \{0, 1\}, \ \forall \ i \in \mathbb{N}\backslash N_2, \ j \in \mathbb{N}\backslash N_2, \tag{20}$$

$$x'_{ij} = \{0, 1\}, \ \forall \ i \in N_1, \ j \in N_1, \tag{21}$$

$$y_i = \{0, 1\}, \ \forall \ i \in N_1, \tag{22}$$

$$f_{ij}^{ur} = \{0, 1\}, \ \forall \ i \in N_1, \ j \in \mathbb{N}\backslash N_0, \ u \in U, \ r \in R, \tag{23}$$

$$c_{ij} \geq 0_{\text{and is an integer}}\, \forall \ i \in \mathbb{N}\backslash N_2, \ j \in \mathbb{N}\backslash N_2, \tag{24}$$

$$z_i, w_i \geq 0, \ \forall \ i \in N_1, \tag{25}$$

$$\bar{z}_i \geq 0, \ \forall \ i \in \mathbb{N}\backslash N_0 \tag{26}$$

5. The routing optimization method for truck-drone integrated rescue vehicles in forest firefighting according to claim 4, wherein the optimization algorithm in step S3 is a branch-and-bound algorithm, a branch-and-price algorithm, or a branch-price-and-cut algorithm that can solve the mixed integer programming model in step S21.

\* \* \* \* \*